UNITED STATES PATENT OFFICE.

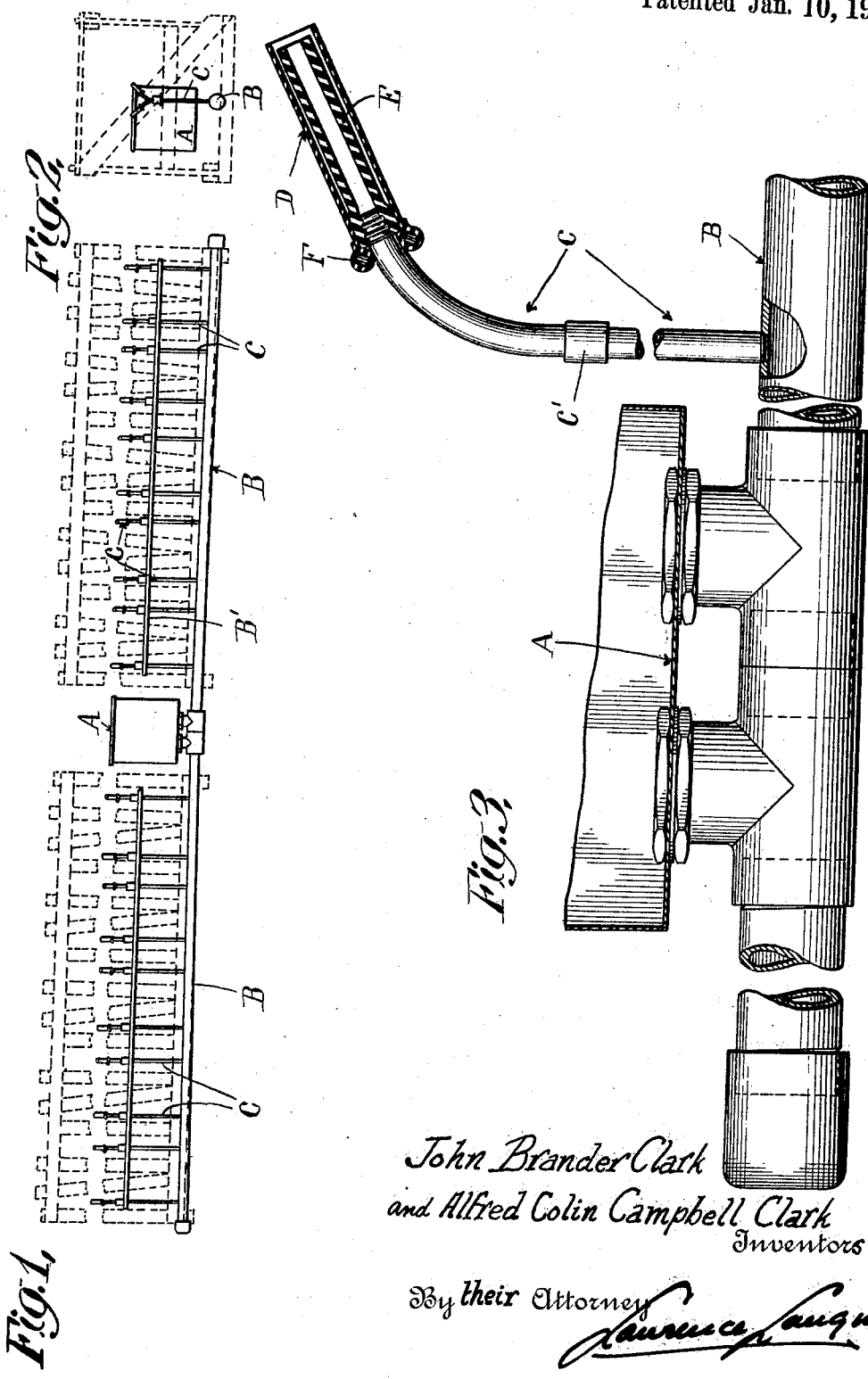

JOHN BRANDER CLARK AND ALFRED COLIN CAMPBELL CLARK, OF KARAKA, PAPAKURA, NEW ZEALAND.

CALF FEEDER.

1,402,739.       Specification of Letters Patent.    Patented Jan. 10, 1922.

Application filed June 11, 1919. Serial No. 303,469.

*To all whom it may concern:*

Be it known that we, JOHN BRANDER CLARK and ALFRED COLIN CAMPBELL CLARK, subjects of the King of Great Britain, residing at Karaka, Papakura, in the Dominion of New Zealand, have invented a new and useful Improved Calf Feeder; and we do hereby declare the following to be a full, clear, and exact description of the same.

This invention relates to an improved arrangement and construction of appliances for use in feeding calves, of that known class in which a pipe main is provided to extend from a container, in which liquid food is placed and such main is provided at intervals along it, with teats (generally of rubber) branching therefrom and which the calves suck in order to be fed with the liquid food.

The present improvements have been devised with the object of providing a construction of these means such as will necessitate the calf exercising its full natural suction powers in order to receive its share of food and thereby to cause its saliva secretions to be given off and mingle with the food, thus ensuring proper digestion.

This arrangement of apparatus is particularly adaptable for fitting into a feeding shed to supply a number of calves simultaneously. In the accompanying drawings, such an arrangement is shown by which twenty calves may be supplied.

In such drawings:—

Figure 1 is a general front elevation of the system.

Figure 2 is an end elevation thereof.

Figure 3 is an enlarged detail showing the special form of teat and the branch and main.

In Figures 1 and 2 the arrangement of a number of bails in a shed is indicated by dotted lines, each bail being arranged to contain two feeding points. The food tank A is positioned at about the floor level and midway along the length of the shed, so that the main pipes B may be carried out from its bottom on each side and along the centre line of the bails. These mains are connected to the tank bottom and to one another in the manner shown in Figure 3, so that a full supply is provided for throughout the whole system.

From the mains the branches C are led upwards, each branch being made to extend vertically for most of its height and then to bend over to an incline at its top end. The height of the top end is arranged at a convenient height for the calf and at a level above the top level of the food in the tank, when such tank is fully charged. The branches are preferably arranged so that they alternately incline in opposite directions so that the two points in each bail will be approached from opposite sides of the main and thus no hustling of one another by the calves can take place, the upper ends of the several branches being supported by the horizontal stay B' extending between them and serving to divide the bail in two. Each branch is also preferably made with a joint C' (Figure 3) to facilitate the insertion of cleaning brushes. Likewise the extreme ends of the mains are covered by caps that may be removed to permit of cleaning appliances being passed through the mains.

The teat placed upon the top end of each branch C is formed, as shown, of two rubber tubes D and E, placed one within the other. The inside tube E is made of thick rubber with a small bore and is attached to the branch top by being stretched over it, such branch end being preferably grooved or threaded to provide a rough gripping surface. The outside tube D may be made of thinner rubber and its size is such as to loosely encircle the inner tube. It is secured in position by having its inner end stretched over the inner end of the tube E and then rolled round a metallic ring F that encircles the branch. This outer tube is also made of a length such that its end projects slightly beyond the end of the inside tube so as to act as a shield thereto.

This form of teat thus resembles in characteristics the teat of a cow, as providing a central duct continuous with the food supply, and a soft outer shield or cushion for the calf to engage with its tongue and palate. It provides for a free and unimpeded flow of the liquid food and thus in addition to the arrangement of the pipe system by which the level of the teat is above the level of the supply, ensures that the calf must suck to feed itself. Consequently the whole system provides for the efficient feeding of the calf without any liability of an oversupply as is the case with most pipe systems of apparatus previously known and in which the supply to the teats is by gravity.

We claim:—

In a calf feeding appliance, the combination of a reservoir for liquid food; main pipes connected to the reservoir and extending in opposite directions therefrom; branch pipes connected to the main pipes at intervals therealong and extending above the level of the liquid in the reservoir; alternate branch pipes being bent adjacent the tops thereof to extend in opposite directions whereby adjacent animals do not interfere with one another; and teats connected to the upper ends of said branches.

In testimony whereof we affix our signatures.

JOHN BRANDER CLARK.
    ALFRED COLIN CAMPBELL CLARK.

Witnesses:
  W. E. HUGHES,
  J. YOUNG.